United States Patent
Tseng et al.

(10) Patent No.: US 11,487,080 B2
(45) Date of Patent: Nov. 1, 2022

(54) HEAD-MOUNTED DISPLAY DEVICE AND ADJUSTMENT METHOD

(71) Applicant: HTC Corporation, Taoyuan (TW)

(72) Inventors: Jian-Zhi Tseng, Taoyuan (TW); Chang-Hsueh Liu, Taoyuan (TW); Sheng-Wen Chen, Taoyuan (TW); Mong-Yu Tseng, Taoyuan (TW)

(73) Assignee: HTC Corporation, Taoyuan (TW)

( * ) Notice: Subject to any disclaimer, the term of this patent is extended or adjusted under 35 U.S.C. 154(b) by 249 days.

(21) Appl. No.: 17/072,040

(22) Filed: Oct. 16, 2020

(65) Prior Publication Data

US 2021/0149151 A1 May 20, 2021

Related U.S. Application Data

(60) Provisional application No. 62/916,804, filed on Oct. 18, 2019.

(51) Int. Cl.
*G02B 7/12* (2021.01)
*H02K 11/21* (2016.01)
(Continued)

(52) U.S. Cl.
CPC ............... *G02B 7/12* (2013.01); *G02B 7/021* (2013.01); *G06T 7/70* (2017.01); *H02K 7/06* (2013.01);
(Continued)

(58) Field of Classification Search
CPC ..... F16H 2025/2081; F16H 2025/2046; F16H 25/20; F16H 19/04; H02K 7/116;
(Continued)

(56) References Cited

U.S. PATENT DOCUMENTS

| 6,529,331 B2 | 3/2003 | Massof et al. |
| 9,696,547 B2 | 7/2017 | Kinnebrew et al. |

(Continued)

FOREIGN PATENT DOCUMENTS

| CN | 107870424 | 4/2018 |
| JP | H0882762 | 3/1996 |

(Continued)

OTHER PUBLICATIONS

"Search Report of Europe Counterpart Application", dated Mar. 22, 2021, p. 1-p. 7.

(Continued)

*Primary Examiner* — David M Fenstermacher
(74) *Attorney, Agent, or Firm* — JCIPRNET

(57) ABSTRACT

A head-mounted display device includes a housing, a pair of display modules, a pair of cameras, a driving module and a control system. The housing can cover eyeballs of the user. The cameras are respectively fixed to the display modules to capture images of the eyeballs. The driving module is coupled to the display module to move the display modules relative to the housing. The control system is electrically connected to the of cameras and the driving module. An adjustment method is applicable to the above-mentioned head-mounted display device. An image of the corresponding eyeball is captured by one of the cameras. The control system calculates a deviation between a center of a pupil of the corresponding eyeball and a center of the corresponding image according to the image. The control system controls the driving module to move the display modules relative to the housing according to the deviation.

19 Claims, 13 Drawing Sheets

(51) Int. Cl.
  *G06T 7/70* (2017.01)
  *G02B 7/02* (2021.01)
  *H02K 7/06* (2006.01)
  *H02K 7/116* (2006.01)
  *F16H 19/04* (2006.01)
  *F16H 25/20* (2006.01)

(52) U.S. Cl.
  CPC .............. *H02K 7/116* (2013.01); *H02K 11/21* (2016.01); *F16H 19/04* (2013.01); *F16H 25/20* (2013.01); *F16H 2025/2046* (2013.01); *F16H 2025/2081* (2013.01)

(58) Field of Classification Search
  CPC .......... H02K 7/06; H02K 11/21; G02B 7/021; G02B 7/12
  See application file for complete search history.

(56) References Cited

U.S. PATENT DOCUMENTS

| | | | |
|---|---|---|---|
| 9,983,709 | B2 | 5/2018 | Trail et al. |
| 10,231,614 | B2 | 3/2019 | Krueger |
| 10,401,625 | B2 | 9/2019 | Petrov |
| 11,410,392 | B2* | 8/2022 | Browy ................... G06F 1/1688 |
| 2017/0213377 | A1 | 7/2017 | Torii et al. |
| 2018/0091805 | A1 | 3/2018 | Liang et al. |
| 2018/0217380 | A1 | 8/2018 | Nishimaki et al. |
| 2021/0125398 | A1* | 4/2021 | Bradley ................... G06T 7/62 |
| 2021/0165220 | A1* | 6/2021 | Nakada ................ G02B 27/0176 |
| 2021/0208364 | A1* | 7/2021 | Chen ........................ G02B 7/12 |
| 2021/0228284 | A1* | 7/2021 | Voigt ..................... G06T 11/003 |
| 2021/0239883 | A1* | 8/2021 | Georgiou ........... G02B 27/0172 |
| 2021/0304509 | A1* | 9/2021 | Berkebile ................. G06T 7/70 |
| 2021/0374918 | A1* | 12/2021 | Margolis ................... G06T 7/70 |
| 2021/0405396 | A1* | 12/2021 | Ma ........................ G06T 19/006 |
| 2021/0407178 | A1* | 12/2021 | Zhou ......................... G06T 7/20 |
| 2022/0099910 | A1* | 3/2022 | Chang .................... G02B 7/021 |
| 2022/0101551 | A1* | 3/2022 | Eberspach ................. G06T 5/50 |
| 2022/0121032 | A1* | 4/2022 | Serizawa ........... G02B 27/0176 |
| 2022/0179218 | A1* | 6/2022 | Son .......................... G06T 7/70 |
| 2022/0206566 | A1* | 6/2022 | Senkal ...................... G06T 7/70 |
| 2022/0229298 | A1* | 7/2022 | Song ................. G02B 27/0179 |
| 2022/0230337 | A1* | 7/2022 | Umemura ............ H04N 5/2226 |
| 2022/0230400 | A1* | 7/2022 | Nakata ...................... H04N 5/66 |
| 2022/0247904 | A1* | 8/2022 | Shigematsu ............. G06F 3/013 |
| 2022/0256138 | A1* | 8/2022 | Oonishi ..................... G06T 7/70 |

FOREIGN PATENT DOCUMENTS

| | | |
|---|---|---|
| JP | H0968670 | 3/1997 |
| JP | H10161058 | 6/1998 |
| TW | 201812385 | 4/2018 |
| TW | 201928444 | 7/2019 |

OTHER PUBLICATIONS

"Office Action of Taiwan Counterpart Application", dated Oct. 28, 2021, p. 1-p. 7.
"Office Action of China Counterpart Application", dated May 5, 2022, p. 1-p. 9.

\* cited by examiner

HEAD-MOUNTED DISPLAY DEVICE AND ADJUSTMENT METHOD

CROSS-REFERENCE TO RELATED APPLICATION

This application claims the priority benefit of U.S. provisional application Ser. No. 62/916,804, filed on Oct. 18, 2019. The entirety of the above-mentioned patent application is hereby incorporated by reference herein and made a part of this specification.

BACKGROUND

Technical Field

This application relates to a display device, and more particularly, to a head-mounted display device and an adjustment method.

Description of Related Art

The head-mounted display device is usually worn on the user's head in the form of an eye mask or a helmet, and projects images on eyeballs of a user at a close distance. When applied to virtual reality (abbr. VR), the head-mounted display device can project images to both eyes of the user, so that the user can have a three-dimensional visual experience. Because the inter-pupillary distances (abbr. IPD) of users are not exactly the same due to the difference in human body structure, the user has to manually adjust a pair of lenses of the head-mounted display device so as to adjust a projection optical path to meet the needs of different users.

SUMMARY

The present application provides a head-mounted display device, which is configured to obtain the inter-pupillary distance of the user and automatically adjust the projection optical path of a pair of display modules accordingly.

The present application provides an adjustment method, which is applicable to a head-mounted display device configured to obtain the inter-pupillary distance of the user and automatically adjust the projection optical path of a pair of display modules accordingly.

The head-mounted display device of the present application includes a housing, a pair of display modules, a pair of cameras, a driving module and a control system. The housing is suitable for covering a pair of eyeballs of the user. Each of the display modules includes a bracket, a display panel and a lens. The bracket is movably connected to the housing. The display panel is fixed to the bracket. The lens is fixed to the bracket. The pair of cameras are respectively fixed to the pair of brackets to respectively capture images of the pair of eyeballs. The driving module is coupled to the pair of brackets to move the pair of brackets relative to the housing. The control system is electrically connected to the pair of cameras and the driving module.

The adjustment method of the present application is applicable to the above-mentioned head-mounted display device. The adjustment method includes the following steps. An image of the corresponding eyeball is captured by one of the pair of cameras. The control system calculates a deviation between a center of a pupil of the corresponding eyeball and a center of the corresponding image according to the image. The control system controls the driving module to move the pair of brackets relative to the housing according to the deviation.

Based on the above, in this application, the images of the eyeballs are obtained by the cameras fixed to the display modules and the deviation is calculated. Then, the display modules are moved by the driving module according to the calculated deviation, so that the display modules can be aligned to the eyeballs of the user to achieve the effect of automatic adjustment.

DESCRIPTION OF THE EMBODIMENTS

Figure 1:
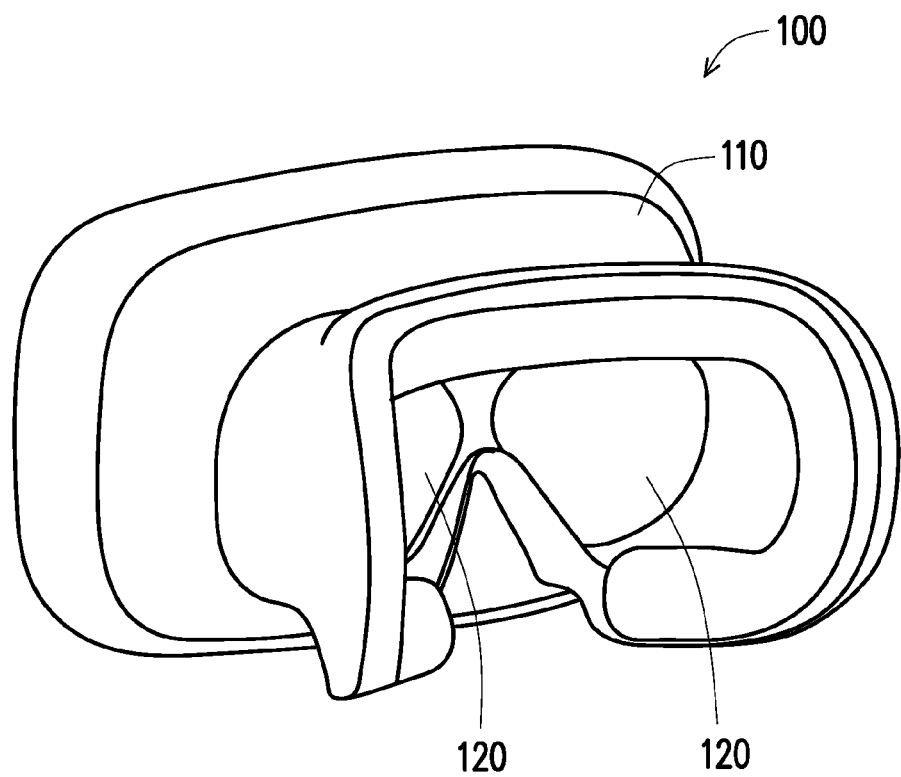
FIG. 1 is a schematic diagram of a head-mounted display device according to an embodiment of the present application.
Figure 2:
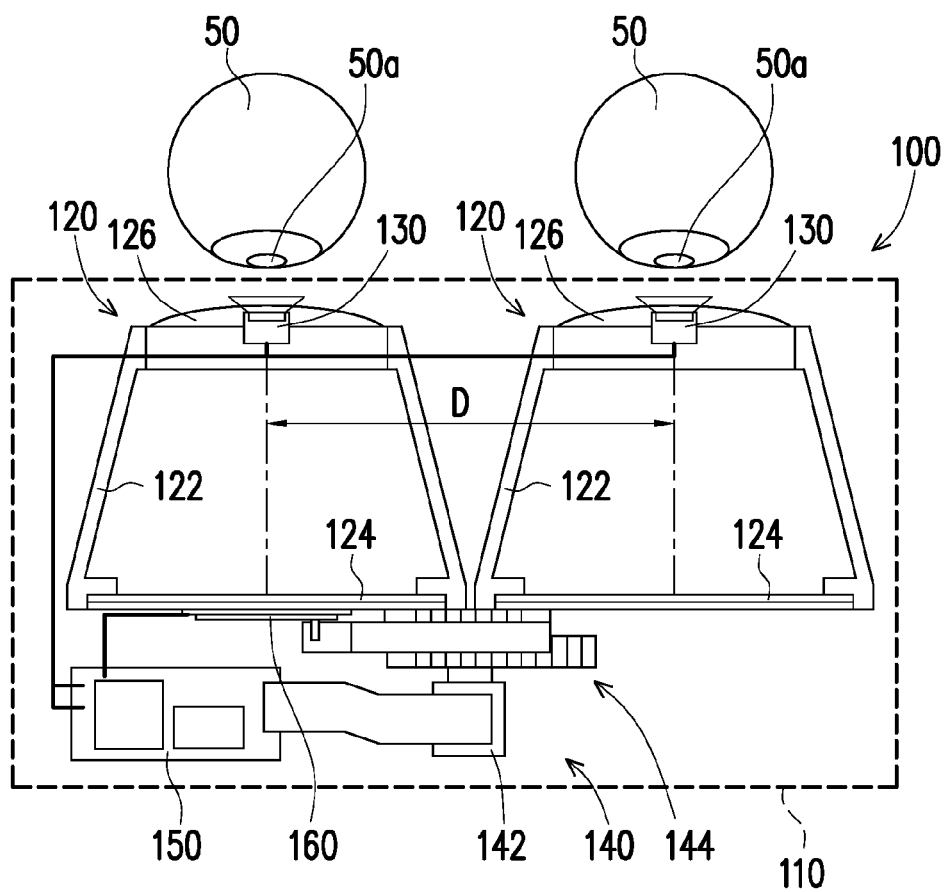
FIG. 2 is a component distribution diagram including the head-mounted display device of FIG. 1 and eyeballs of a user.

Referring to FIG. 1, in this embodiment, a head-mounted display device 100 includes a housing 110 and a pair of display modules 120. The housing 110 is suitable for covering a pair of eyeballs 50 of a user (as shown in FIG. 2). The pair of display modules 120 are disposed in the housing 110, and configured to project images to both eyes of the user respectively, so that the user can have a three-dimensional visual experience.

Referring to FIG. 2, each of the display modules 120 includes a bracket 122, a display panel 124 and a lens 126. The bracket 122 is movably connected to the housing 110. The display panel 124 is fixed to the bracket 122. The lens 126 is fixed to the bracket 122. Therefore, when the bracket 122 is moved relative to the housing 110, the corresponding display panel 124 and the corresponding lens 126 can be moved relative to the housing 110.

Figure 3:
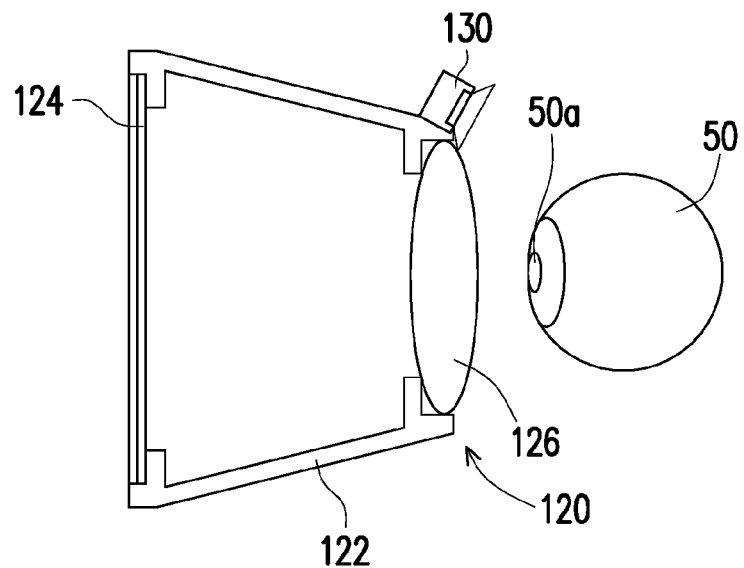
FIG. 3 is a schematic diagram of the display module of FIG. 1 and the eyeball of the user from another perspective.
Figure 4:
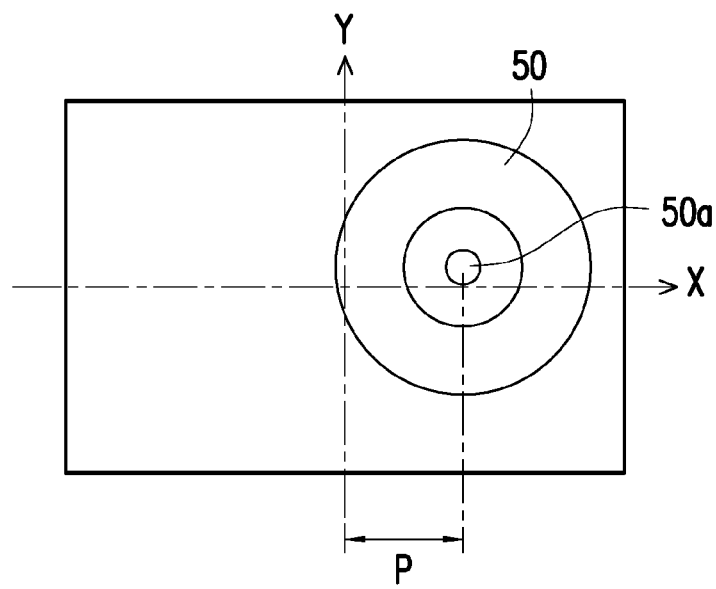
FIG. 4 is an example of an image captured by the camera of FIG. 2.

Referring to FIG. 2, FIG. 3 and FIG. 4, the head-mounted display device 100 further includes a pair of cameras 130, which are respectively fixed to the pair of brackets 122 to respectively capture images of the pair of eyeballs 50. A distance between a center of a pupil 50a and a center of the image is P.

Referring to FIG. 2, the head-mounted display device 100 further includes a driving module 140 and a control system 150. The driving module 140 is coupled to the brackets 122 to move the pair of brackets 122 relative to the housing 110. The control system 150 is electrically connected to the pair of cameras 130 and the driving module 140. In this embodiment, the control system 150 calculates a deviation between the center of the pupil 50a of the eyeball 50 and the center of the image according to the image of the corresponding eyeball 50 captured by one of the pair of cameras 130, and moves the pair of brackets 122 relative to the housing 110 by the driving module 140 according to the deviation. The movement path is not limited to a straight line, but may also be a curve. In the process of moving the pair of brackets 122, the steps of image capture, deviation calculation and movement described above can be repeated. Through multiple cycles, the pair of display modules 120 can gradually reach a higher alignment accuracy from a lower alignment accuracy to be more aligned with the pupils 50a of the pair of eyeballs 50 of the user.

Figure 5:
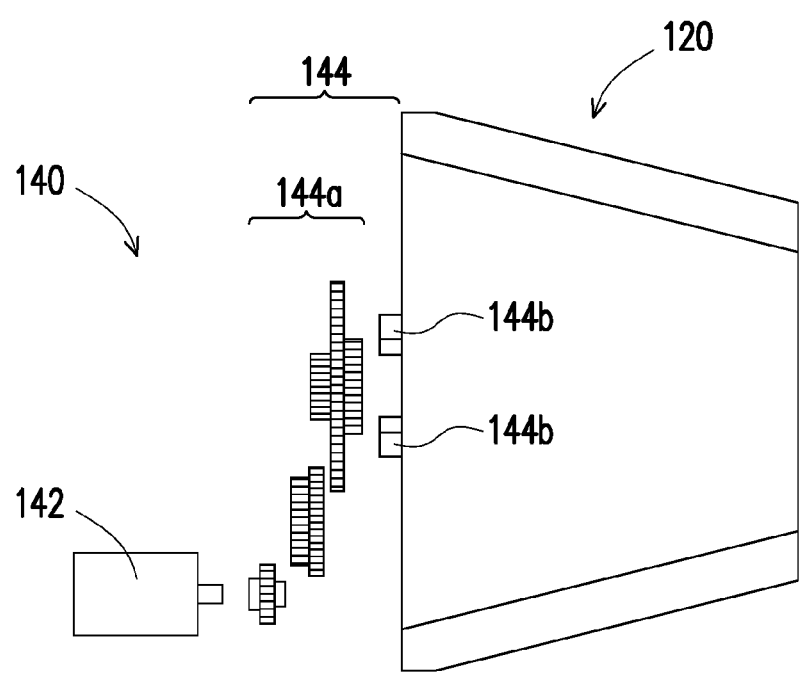
FIG. 5 is a schematic diagram of the display module and the driving module of FIG. 1.
Figure 6A:
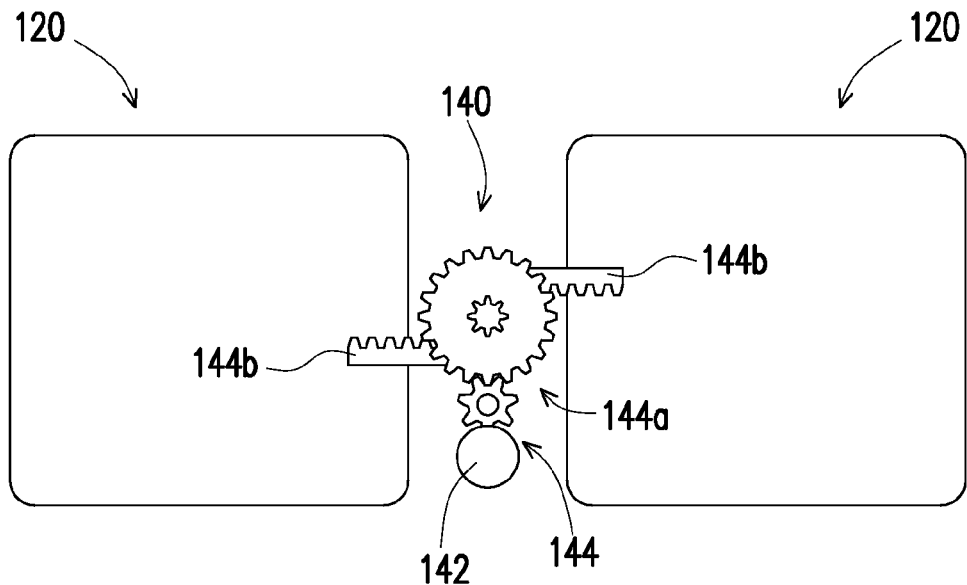
FIG. 6A is a schematic diagram of the driving module of FIG. 1 that relatively moves the pair of display modules away from each other.
Figure 6B:
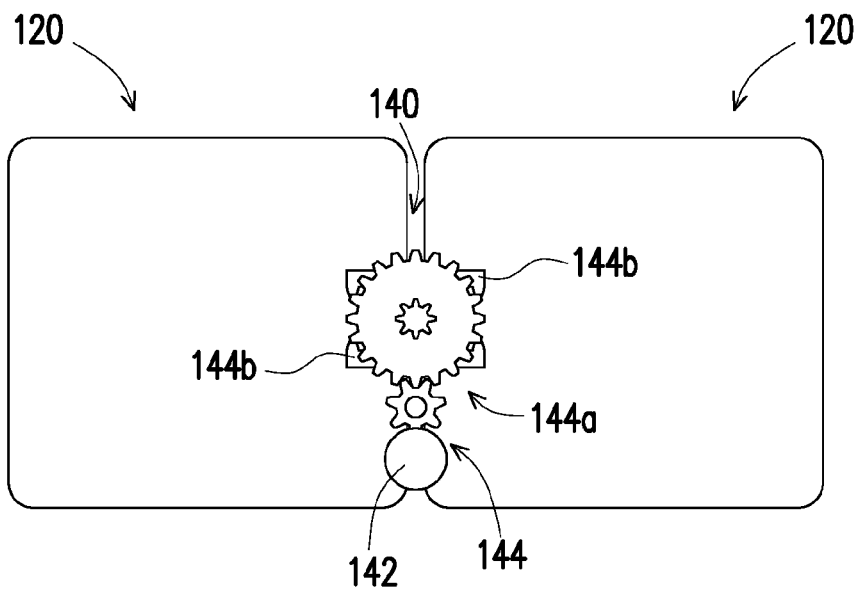
FIG. 6B is a schematic diagram of the driving module of FIG. 6A that relatively moves the pair of display modules close to each other.

Referring to FIG. 5 and FIG. 6A, each of the display modules 120 can be slidably disposed in the housing 110 of FIG. 2. The driving module 140 includes an actuator 142 and a transmission mechanism 144. The actuator 142 is disposed in the housing 110 and electrically connected to the control system 150. The transmission mechanism 144 is disposed in the housing 110 and coupled to the actuator 142 and the pair of brackets 122. Accordingly, the actuator 142 can simultaneously move the pair of display modules 120 by the transmission mechanism 144, so that the pair of display modules 120 can be close to each other or away from each other. In this embodiment, the actuator 142 includes a motor, such as a stepping motor, a servo motor or the like. The transmission mechanism 144 includes a gear set 144a and a pair of racks 144b. The gear set 144a includes a plurality of gears, which are pivoted into the housing 110 and are fixed and coupled to each other. The pair of racks 144b are respectively fixed on the pair of brackets 122. The gear set 144a is coupled to the motor and the pair of racks 144b. A rotation output by the actuator 142 can be converted into a linear translation by the gear set 144a and the pair of racks 144b to move the pair of display modules 120 synchronously (i.e., a synchronous driving mode). States of the pair of display modules 120 being close to each other and away from each other are shown in FIG. 6A and FIG. 6B, respectively.

Figure 7A:
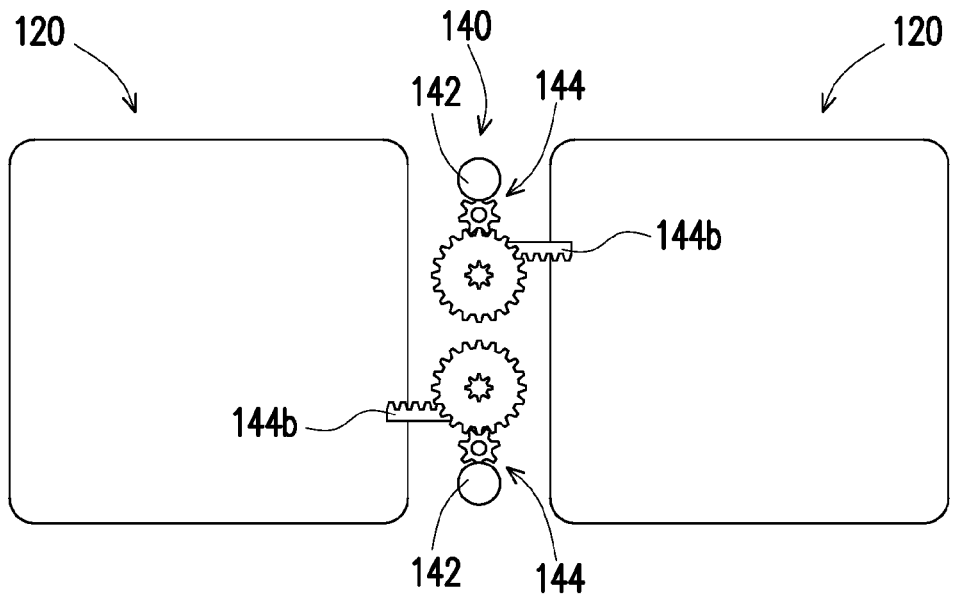
FIG. 7A is a schematic diagram of a driving module that relatively moves a pair of display modules away from each other in a head-mounted display device according to another embodiment of the present application.
Figure 7B:
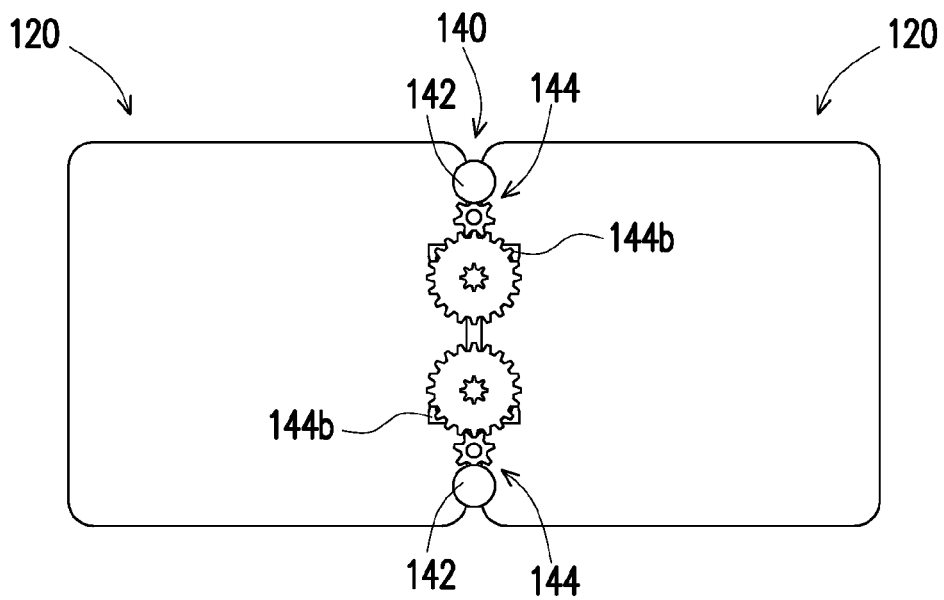
FIG. 7B is a schematic diagram of the driving module of FIG. 7A that relatively moves the pair of display modules close to each other.

Referring to FIG. 7A, in another embodiment, each of the display modules 120 can be slidably disposed in the housing 110 of FIG. 2. The driving module 140 includes a pair of actuators 142 and a pair of transmission mechanisms 144. The pair of actuators 142 are disposed in the housing 110 and electrically connected to the control system 150. The pair of transmission mechanisms 144 are disposed in the housing 110 and coupled to the pair of actuators 142 and the pair of brackets 122. Accordingly, each of the actuators 142 can move the corresponding display module 120 by the corresponding transmission mechanism 144. In this embodiment, the actuator 142 includes a motor, such as a stepping motor, a servo motor or the like. The transmission mechanism 144 includes a gear set 144a and a pair of racks 144b. Each of the gear sets 144a includes a plurality of gears, which are pivoted into the housing 110 and are fixed and coupled to each other. Each of the racks 144b is fixed to the corresponding bracket 122. Each of the gear sets 144a is coupled between the corresponding motor and the corresponding rack 144b. A rotation output by each of the actuators 142 can be converted into a linear translation by the corresponding gear set 144a and the corresponding rack 144b to move the corresponding display module 120 (i.e., an asynchronous driving mode). States of the pair of display modules 120 being close to each other and away from each other are shown in FIG. 7A and FIG. 7B, respectively.

Figure 8A:
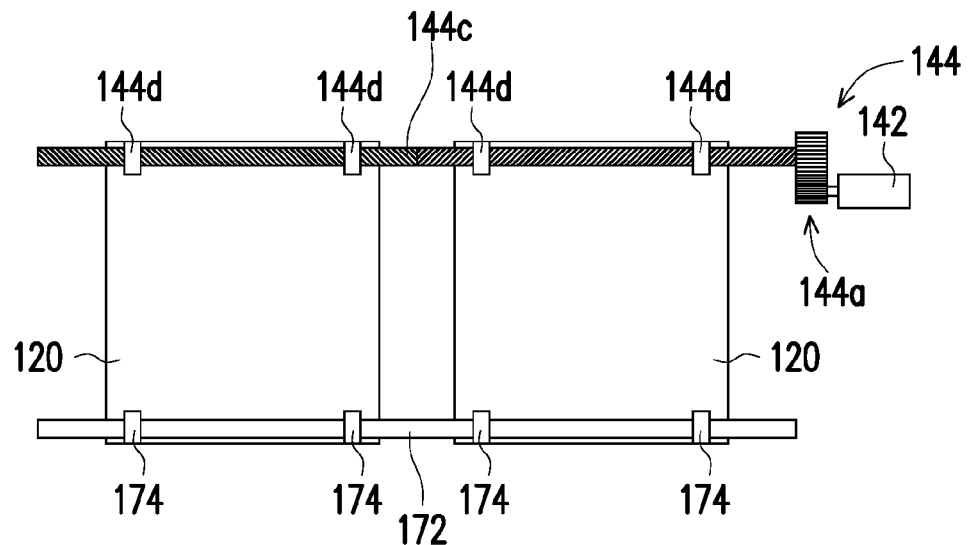
FIG. 8A is a schematic diagram of a driving module that relatively moves a pair of display modules away from each other in a head-mounted display device according to another embodiment of the present application.
Figure 8B:
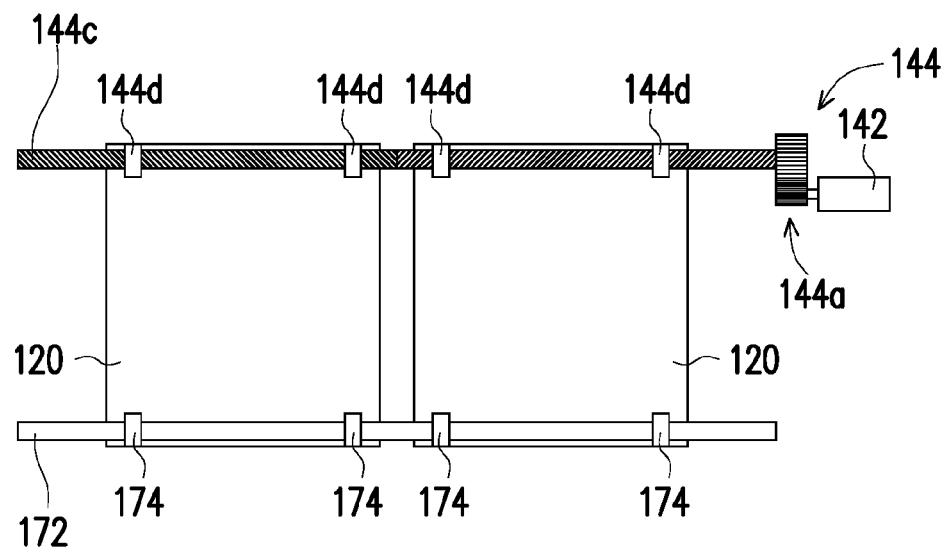
FIG. 8B is a schematic diagram of the driving module of FIG. 8A that relatively moves the pair of display modules close to each other.

Referring to FIG. 8A, in another embodiment, each of the display modules 120 can be slidably disposed in the housing 110 of FIG. 2. In this embodiment, each of the display modules 120 is slidably disposed in the housing 110 of FIG. 2 by a sliding bar 172 and a sliding bar sleeve 174. The driving module 140 includes an actuator 142 and a transmission mechanism 144. The actuator 142 is disposed in the housing 110 and electrically connected to the control system 150. The transmission mechanism 144 is disposed in the housing 110 and coupled to the actuator 142 and the pair of brackets 122. Accordingly, the actuator 142 can simultaneously move the pair of display modules 120 by the transmission mechanism 144, so that the pair of display modules 120 can be close to each other or away from each other. Each of the display modules 120 can be slidably disposed in the housing 110 of FIG. 2. In this embodiment, the actuator 142 includes a motor, such as a stepping motor, a servo motor or the like. The transmission mechanism 144 includes a gear set 144a, a screw 144c and one or more screw sleeves 144d. The gear set 144a includes a plurality of gears, which are pivoted into the housing 110 and are coupled to each other. The screw sleeves 144d are respectively fixed to the pair of brackets 122 and coupled to the screw 144c. The gear set 144a is coupled to the motor and the screw 144c. A rotation output by the actuator 142 can be converted into a linear translation by the gear set 144a, the screw 144c and the screw sleeves 144d to move the pair of display modules 120 synchronously (i.e., the synchronous driving mode). States of the pair of display modules 120 being close to each other and away from each other are shown in FIG. 8A and FIG. 8B, respectively.

Figure 9A:
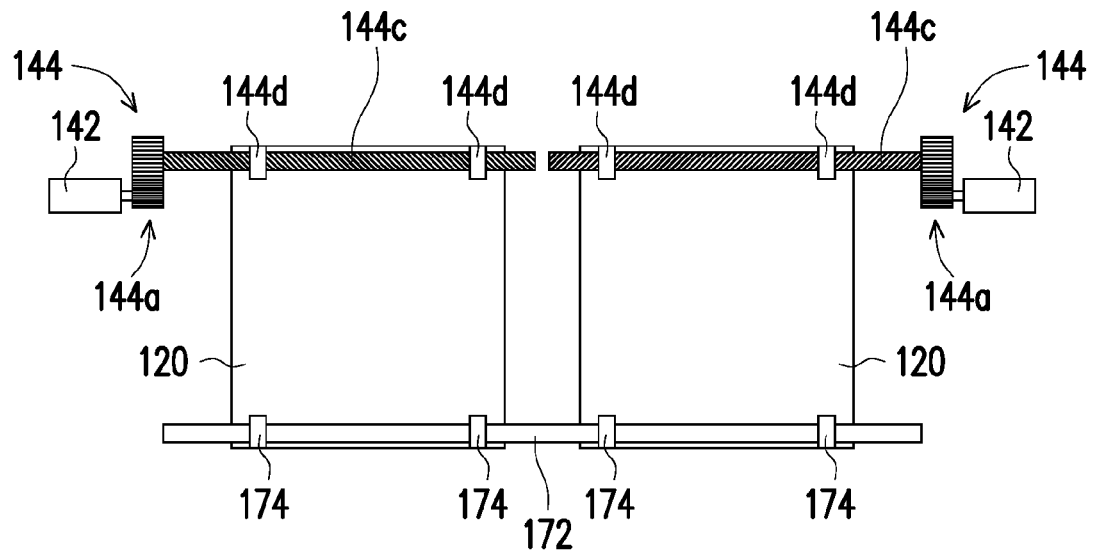
FIG. 9A is a schematic diagram of a driving module that relatively moves a pair of display modules away from each other in a head-mounted display device according to another embodiment of the present application.
Figure 9B:
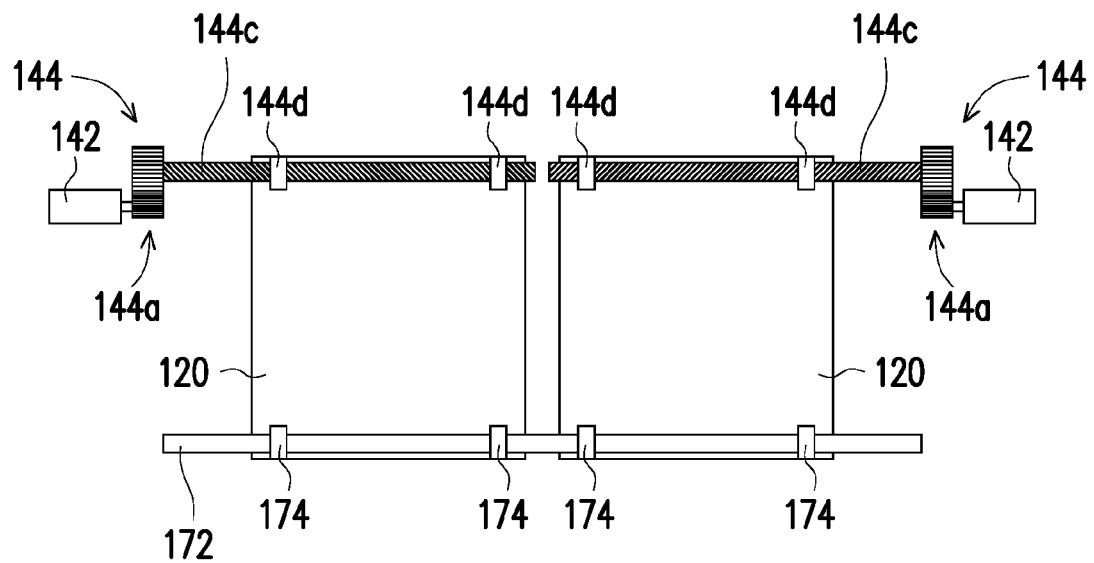
FIG. 9B is a schematic diagram of the driving module of FIG. 9A that relatively moves the pair of display modules close to each other.

Referring to FIG. 9A, in another embodiment, each of the display modules 120 can be slidably disposed in the housing 110 of FIG. 2. In this embodiment, each of the display modules 120 is slidably disposed in the housing 110 of FIG. 2 by a sliding bar 172 and a sliding bar sleeve 174. The driving module 140 includes a pair of actuators 142 and a pair of transmission mechanisms 144. The pair of actuators 142 are disposed in the housing 110 and electrically connected to the control system 150. The pair of transmission mechanisms 144 are disposed in the housing 110 and coupled to the pair of actuators 142 and the pair of brackets 122. Accordingly, each of the actuators 142 can move the corresponding display module 120 by the corresponding transmission mechanism 144. In this embodiment, the actuator 142 includes a motor, such as a stepping motor, a servo motor or the like. Each of the transmission mechanisms 144 includes a gear set 144a, a screw 144c and one or more screw sleeves 144d, The gear set 144a includes a plurality of gears, which are pivoted into the housing 110 and are coupled to each other. The screw sleeves 144d are respectively fixed to the corresponding bracket 122 and coupled to the corresponding screw 144c. The gear set 144a is coupled to the motor and the screw 144c. A rotation output by each of the actuators 142 can be converted into a linear translation by the corresponding gear set 144a, the corresponding screw 144c and the corresponding screw sleeves 144d to move the corresponding display module 120 (i.e., the asynchronous driving mode). States of the pair of display modules 120 being close to each other and away from each other are shown in FIG. 9A and FIG. 9B, respectively.

Figure 10A:
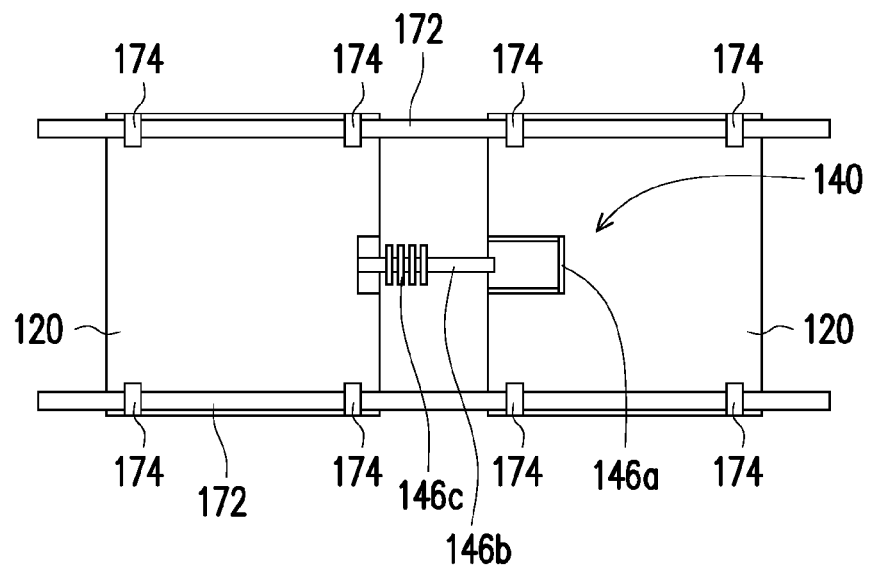
FIG. 10A is a schematic diagram of a driving module that relatively moves a pair of display modules away from each other in a head-mounted display device according to another embodiment of the present application.
Figure 10B:
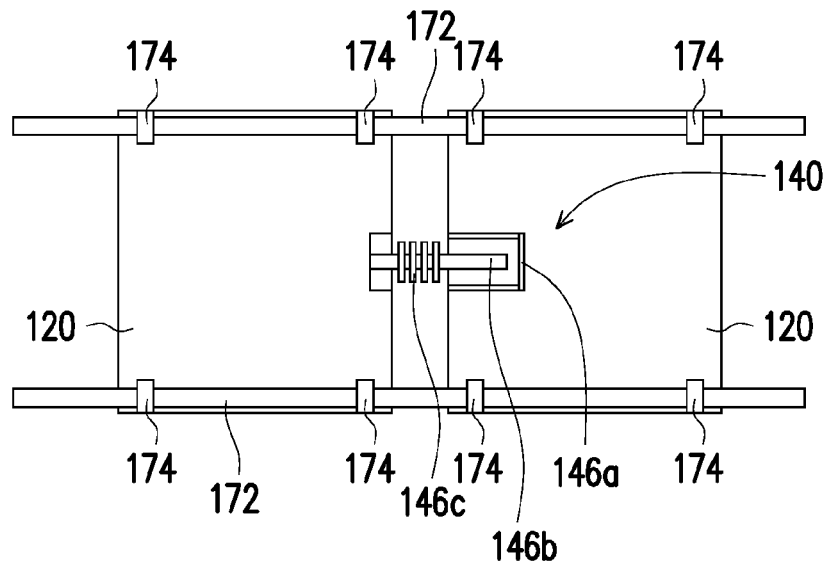
FIG. 10B is a schematic diagram of the driving module of FIG. 10A that relatively moves the pair of display modules close to each other.

Referring to FIG. 10A, in another embodiment, each of the display modules 120 can be slidably disposed in the housing 110 of FIG. 2. In this embodiment, each of the display modules 120 is slidably disposed in the housing 110 of FIG. 2 by a sliding bar 172 and a sliding bar sleeve 174. In this embodiment, the driving module 140 includes a fixed magnet 146a, a rod-shaped magnet 146b and a coil 146c. The fixed magnet 146a is fixed to one of the pair of brackets 122. One end of the rod-shaped magnet 146b is fixed to another one of the pair of brackets 122, and another end of the rod-shaped magnet 146b faces the fixed magnet 146a. The coil 146c is electrically connected to the control system 150 of FIG. 2 and surrounds the rod-shaped magnet 146b to generate an electromagnetic field to drive the rod-shaped magnet 146b to move relative to the fixed magnet 146a. Accordingly, the magnetic attraction or repulsion between the fixed magnet 146a and the rod-shaped magnet 146b and the electromagnetic field generated when the coil 146c is energized can be used to move the pair of display modules 120 synchronously (i.e., the synchronous driving mode). States of the pair of display modules 120 being close to each other and away from each other are shown in FIG. 10A and FIG. 10B, respectively.

Figure 11A:
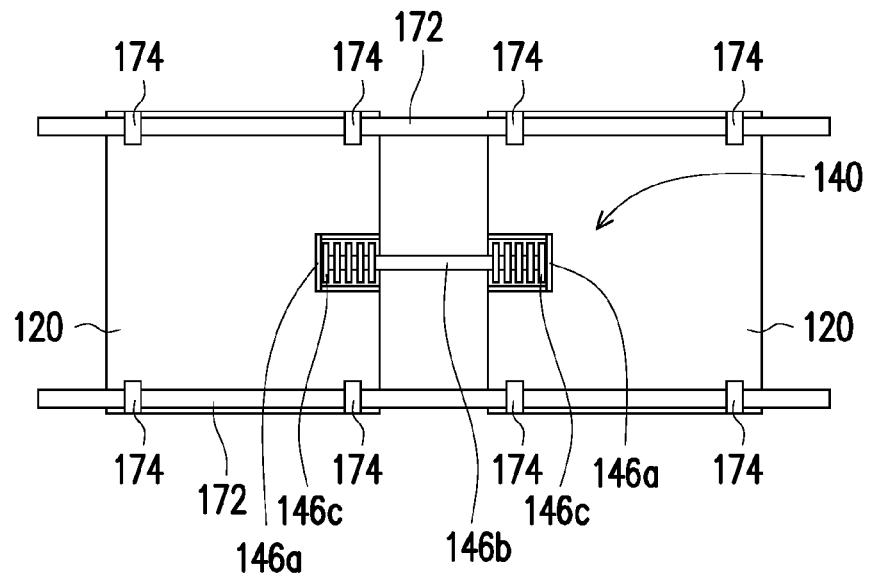
FIG. 11A is a schematic diagram of a driving module that relatively moves a pair of display modules away from each other in a head-mounted display device according to another embodiment of the present application.
Figure 11B:
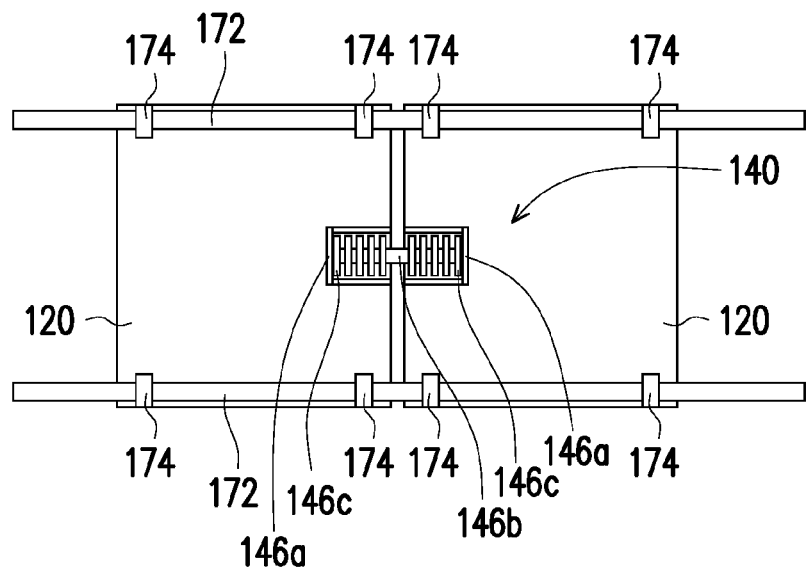
FIG. 11B is a schematic diagram of the driving module of FIG. 11A that relatively moves the pair of display modules close to each other.

Referring to FIG. 11A, in another embodiment, each of the display modules 120 can be slidably disposed in the housing 110 of FIG. 2. In this embodiment, each of the display modules 120 is slidably disposed in the housing 110 of FIG. 2 by a sliding bar 172 and a sliding bar sleeve 174. In this embodiment, the driving module 140 includes a pair of fixed magnets 146a, a rod-shaped magnet 146b and a pair of coils 146c. The pair of fixed magnets 146a are respectively fixed to the pair of brackets 122. Two ends of the rod-shaped magnet 146b respectively face the pair of fixed magnets 146a. The pair of coils 146c are electrically connected to the control system 150 and surrounds the rod-shaped magnet 146b to generate electromagnetic fields to drive the two ends of the rod-shaped magnet 146b to respectively move relative to the fixed magnet 146a. Accordingly, the magnetic attraction or repulsion between the pair of fixed magnets 146a and the two ends of the rod-shaped magnet 146b and the electromagnetic fields generated when the pair of coils 146c are energized can be used to move the pair of display modules 120 respectively (i.e., the asynchronous driving mode). States of the pair of display modules 120 being close to each other and away from each other are shown in FIG. 11A and FIG. 11B, respectively.

In the embodiments of the synchronous driving mode (e.g., the embodiments of FIGS. 6A, 8A and 10A), the control system 150 of FIG. 2 can calculate two deviations according to positions of centers of the two eyeballs 50 captured by the pair of cameras 130 and positions of absolute centers of the two display modules 120 and determine and select one of the two deviations (e.g., select a minimal value or a maximal value), or calculate a proper tradeoff value by an algorithm to give instructions to the driving module 140, so that the driving module 140 can adjust the absolute centers of the pair of display modules 120 to positions relative to the pupils 50a of the eyeballs 50 calculated by the control system 150.

In the embodiments of the asynchronous driving mode (e.g., the embodiments of FIGS. 7A, 9A and 11A), According to positions of the centers of the pupils of the two eyeballs 50 captured by the pair of cameras 130 and positions of absolute centers of the two display modules 120, the control system 150 of FIG. 2 can give instructions respectively to the pair of driving modules 140, so that the pair of display modules 140 can respectively adjust the absolute centers of the pair of display modules 120 to be aligned with the positions of the pupils 50a of the eyeballs 50. The embodiments of the asynchronous driving mode can meet the users with asymmetric inter-pupillary distance (IPD).

Referring to FIG. 2 and FIG. 4, the head-mounted display device 100 can further include a position sensor 160. The position sensor 160 is electrically connected to the control system 150, and capable of sensing a position of one of the pair of display modules 120 relative to the housing 110. The position sensor 160 senses the position of one of the pair of display modules 120 relative to the housing 110, and the control system 150 calculates a distance D between absolute centers of the pair of display modules 120 according to a sensed value of the position sensor 160 (see FIG. 2). Accordingly, the sensed value of the position sensor 160 can be used to calculate the distance D between the absolute centers of the pair of the display modules 120 (see FIG. 2) and a deviation P between the center of the pupil 50a of the eyeball 50 and the center of the image (see FIG. 4). Among them, a deviation of the left eye is PL, and a deviation of the right eye is PR, an actual inter-pupillary distance IPD of the user may be calculated as equal to a sum of D, PL and PR. In this embodiment, the position sensor 160 can be fixed in the housing 110, and coupled to the driving module 140 (e.g., the rack 144b of the transmission mechanism 144 shown in FIG. 5 and FIG. 6A) to sense the movement of the rack 144b.

Figure 12:
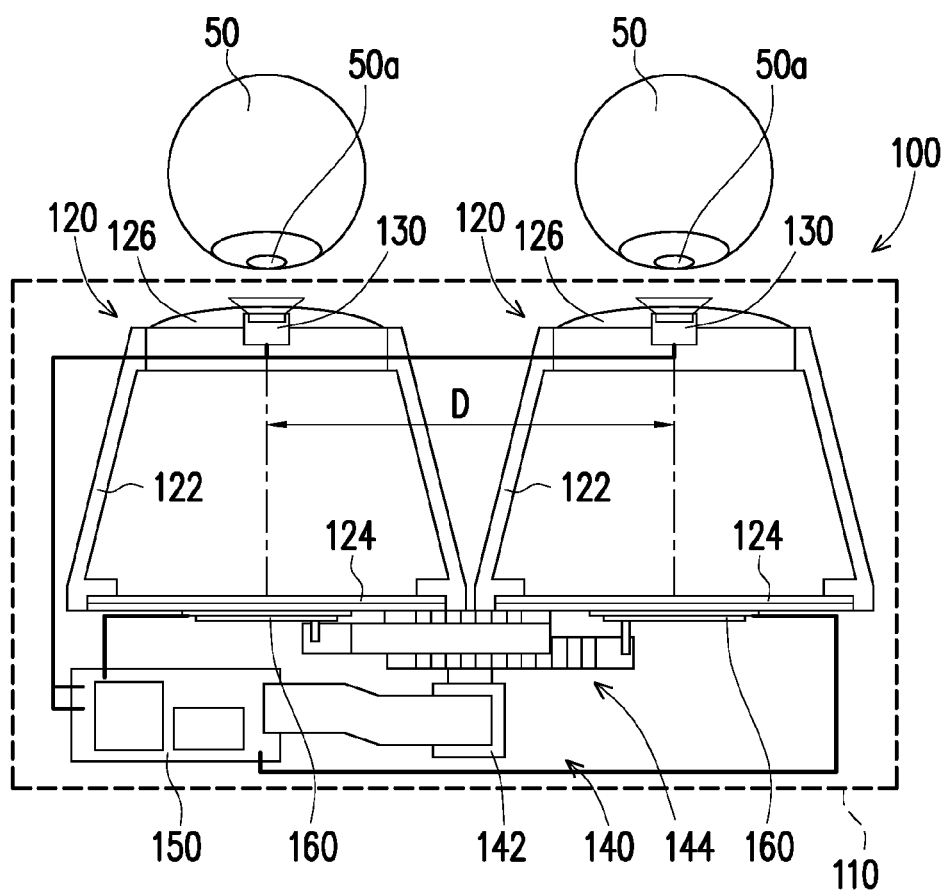
FIG. 12 is a component distribution diagram including a head-mounted display device of and eyeballs of a user according to another embodiment of the present application.

Referring to FIG. 12, the head-mounted display device 100 can further include a pair of position sensors 160. The pair of position sensors 160 are electrically connected to the control system 150, and capable of respectively sensing positions of the pair of display modules 120 relative to the housing 110. The pair of position sensors 160 respectively sense the positions of the pair of display modules 120 relative to the housing 110, and the control system 150 calculates a distance D between the pair of display modules 120 according to sensed values of the pair of position sensors 160. Accordingly, the sensed value of the position sensor 160 can be used to calculate the distance D between the absolute centers of the pair of the display modules 120 (see FIG. 12) and a deviation P between the center of the pupil 50*a* of the eyeball 50 and the center of the image (see FIG. 4). Among them, a deviation of the left eye is PL, and a deviation of the right eye is PR, an the actual interpupillary distance IPD of the user may be calculated as equal to a sum of D, PL and PR. In this embodiment, the pair of position sensors 160 can be fixed in the housing 110, and each of the position sensors 160 is coupled to the corresponding driving module 140 (e.g., the rack 144*b* of the transmission mechanism 144 shown in FIG. 7A) to sense the movement of the rack 144*b*.

Referring to FIG. 2, the present application proposes an adjustment method suitable for the embodiment of FIG. 2. First of all, an image of the corresponding eyeball 50 is captured by one of the pair of cameras 130. Next, a deviation between the center of the pupil 50*a* of the corresponding eyeball 50 and the center of the corresponding image is calculated by the control system 150 according to the image. Then, the driving module 140 is controlled by the control system 150 to move the pair of brackets 122 relative to the housing 110 according to the deviation.

When the adjustment method is applied to the embodiments of FIG. 6A and FIG. 8A (single actuator 142 and single transmission mechanism 144), the step of moving the pair of brackets 122 includes controlling the actuator 142 by the control system 150 to generate a power according to the deviation, and converting the power generated by the actuator 142 by the transmission mechanism 144 to move the pair of brackets 122.

When the adjustment method is applied to the embodiments of FIG. 7A and FIG. 9A (dual actuators 142 and dual transmission mechanisms 144), the step of moving the pair of brackets 122 includes controlling the pair of actuators 142 by the control system 150 to generate powers according to the deviation, and respectively converting the powers generated by the pair of actuators 142 by the pair of transmission mechanisms 144 to respectively move the pair of brackets 122.

When the adjustment method is applied to the embodiment of FIG. 10A (a magnetic driving assembly in the synchronous driving mode), the step of moving the pair of brackets 122 includes generating an electromagnetic field by the coil 146*c* to drive the rod-shaped magnet 146*b* to move relative to the fixed magnet 146*a*.

When the adjustment method is applied to the embodiment of FIG. 11A (a magnetic driving assembly in the asynchronous driving mode), the step of moving the pair of brackets 122 includes generating electromagnetic fields by the pair of coils 146*c* to drive two ends of the rod-shaped magnet 146*b* to respectively move relative to the fixed magnet 146*a*.

When the adjustment method is applied to the embodiment of FIG. 2 (single position sensor 160), the adjustment method further includes controlling the position sensor 160 by the control system 150 to sense a position of one of the pair of display modules 120 relative to the housing 110, and calculating a distance D between the pair of display modules 120 by the control system 150 according to a sensed value of the position sensor 160.

When the adjustment method is applied to the embodiment of FIG. 12 (the pair of position sensors 160), the adjustment method further includes controlling the pair of position sensors 160 by the control system 150 to respectively sense positions of the pair of display modules 120 relative to the housing 110, and calculating a distance D between the pair of display modules 120 by the control system 150 according to sensed values of the pair of position sensors 160.

Figure 13:
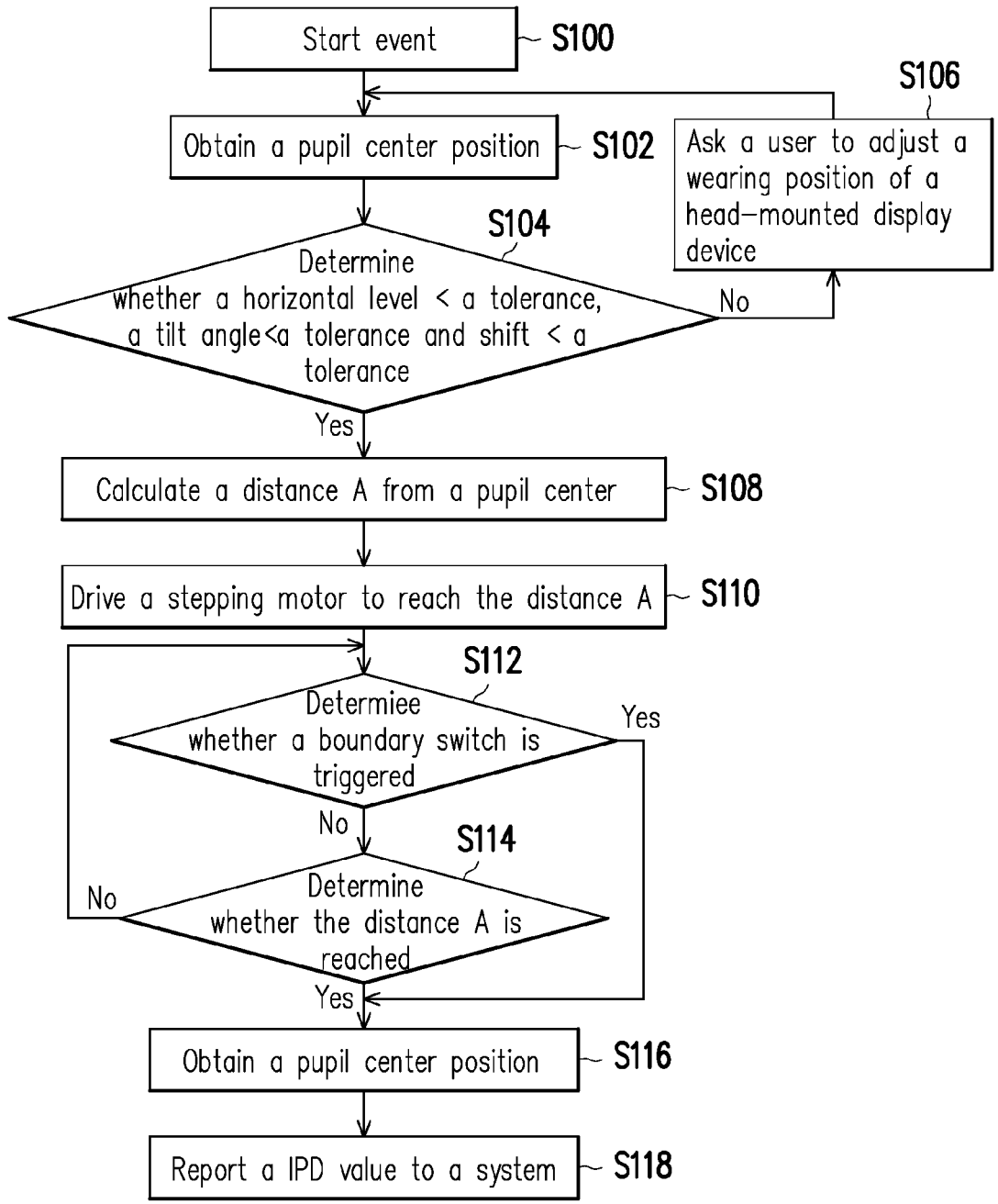
FIG. 13 is a control process flowchart applied to the head-mounted display device of FIG. 2.

The embodiments of the head-mounted display device 100 based on the synchronous driving mode (e.g., the embodiments of the head-mounted display device 100 in FIG. 6A, FIG. 8A and FIG. 10A) can be operated according to the control process shown in FIG. 13.

Referring to FIG. 13, as shown in step S100, an event is started. Next, step S102 is execute to obtain a pupil center position (i.e., to initialize a pose and the pupil center position of the head-mounted display device 100).

Next, step S104 is executed to determine whether a horizontal level is less than a tolerance, a tilt angle is less than a tolerance and a shift is less than a tolerance (i.e., to determine whether the horizontal level, the tilt angle and the shift between the head mounted display device 100 and the user's head are less than allowable tolerance ranges). The horizontal level is obtained by interpreting the images of the eyes. The tilt angle is obtained by an inertial measurement unit (IMU) of the control system 150. The shift can be obtained by interpreting the images of the eyes through Eye-tracking. Alternatively, a relative shift of the human eye and the helmet can be obtained by magnetic field or ultrasonic wave relative position sensors.

If the determination is "No" (i.e., the horizontal level, the tilt angle, or the shift between the head mounted display device 100 and the user's head is greater than the allowable tolerance range), step S106 is executed to ask the user to adjust a wearing position of the head-mounted display device 100, and the process returns to step S104. If the determination is "Yes" (i.e., the horizontal level, the tilt angle and the shift between the head mounted display device 100 and the user's head are less than the allowable tolerance ranges), step S108 is executed to calculate a distance A between the center of the pupil of one single eye and a center of the lens with the eye-tracking function.

Next, step S110 is executed to drive a stepping motor (i.e., the actuator 142 of the driving module 140) to reach the distance A.

Next, step S112 is executed to determine whether a boundary switch is triggered. The boundary switch is used to sense whether the display module 120 moves beyond a preset moving range. If the determination is "No" (i.e., the boundary switch is not triggered), step S114 is executed. If the determination is "Yes" (i.e., the boundary switch is triggered), step S114 is skipped and step S116 is executed. In step S114, whether the distance A is reached is determined. If the determination is "Yes" (i.e., the distance A is reached), step S116 is executed. If the determination is "No" (i.e., the distance A is not reached), the process returns to step S112.

In step S116, a pupil center position is obtained (i.e., a pupil center position of the other eye is obtained, or pupil center positions of both eyes are obtained).

Then, step S118 is executed to report a IPD value to a system (e.g., a computer system) for the purpose of calibration of the subsequent 3D effect.

Figure 14:
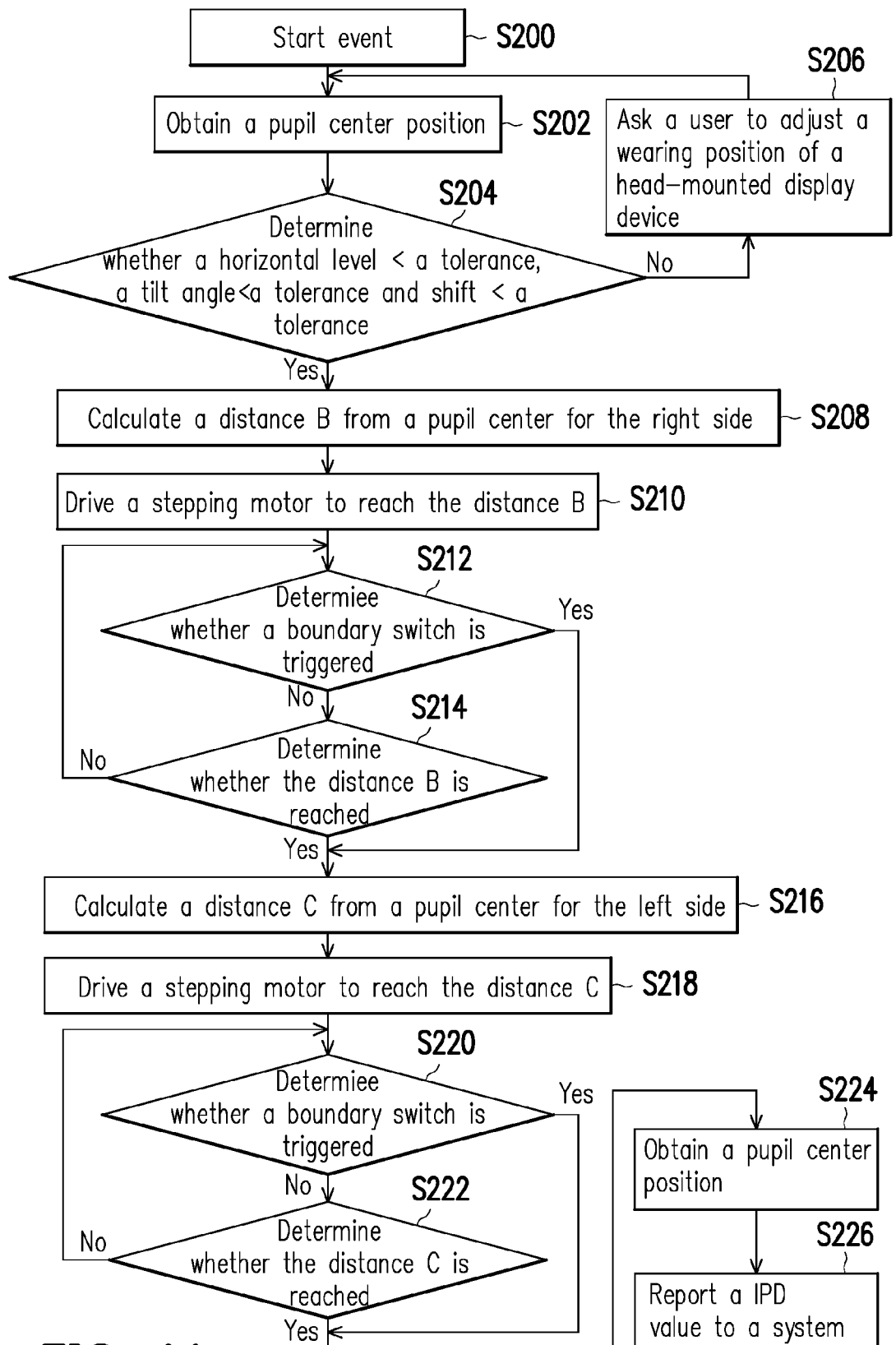
FIG. 14 is another control process flowchart applied to the head-mounted display device of FIG. 2.

The embodiments of the head-mounted display device 100 based on the asynchronous driving mode (e.g., the embodiments of the head-mounted display device 100 in FIG. 7A, FIG. 9A and FIG. 11A) can be operated according to the control process shown in FIG. 14.

Referring to FIG. 14, as shown in step S200, an event is started. Next, step S202 is execute to obtain a pupil center position (i.e., to initialize a pose and the pupil center position of the head-mounted display device 100). Next, step S204 is executed to determine whether a horizontal level is less than a tolerance, a tilt angle is less than a tolerance and a shift is less than a tolerance (i.e., to determine whether the horizontal level, the tilt angle and the shift between the head mounted display device 100 and the user's head are less than allowable tolerance ranges). The shift can be obtained by interpreting the images of the eyes through Eye-tracking. Alternatively, a relative shift of the human eye and the helmet can be obtained by magnetic field or ultrasonic wave relative position sensors.

If the determination is "No" (i.e., the horizontal level, the tilt angle, or the shift between the head mounted display device 100 and the user's head is greater than the allowable tolerance range), step S206 is executed to ask the user to adjust a wearing position of the head-mounted display device 100, and the process returns to step S204. If the determination is "Yes" (i.e., the horizontal level, the tilt angle and the shift between the head mounted display device 100 and the user's head are less than the allowable tolerance ranges), step S208 is executed to calculate a distance B between the center of the pupil of the right eye and a center of the lens with the eye-tracking function.

Next, step S210 is executed to drive a stepping motor (i.e., the actuator 142 of the driving module 140) to reach the distance B.

Next, step S212 is executed to determine whether a boundary switch is triggered. The boundary switch is used to sense whether the display module 120 moves beyond a preset moving range. If the determination is "No" (i.e., the boundary switch is not triggered), step S214 is executed. If the determination is "Yes" (i.e., the boundary switch is triggered), step S214 is skipped and step S216 is executed. In step S214, whether the distance B is reached is determined. If the determination is "Yes" (i.e., the distance B is reached), step S216 is executed. If the determination is "No" (i.e., the distance B is not reached), the process returns to step S212.

In step S216, a distance C between the center of the pupil of the left eye and a center of the lens with the eye-tracking function.

Next, step S218 is executed to drive a stepping motor (i.e., the actuator 142 of the driving module 140) to reach the distance C.

Next, step S220 is executed to determine whether a boundary switch is triggered. The boundary switch is used to sense whether the display module 120 moves beyond a preset moving range. If the determination is "No" (i.e., the boundary switch is not triggered), step S222 is executed. If the determination is "Yes" (i.e., the boundary switch is triggered), step S222 is skipped and step S224 is executed. In step S222, whether the distance C is reached is determined. If the determination is "Yes" (i.e., the distance C is reached), step S224 is executed.

In step S224, a pupil center position is obtained (i.e., pupil center positions of both eyes are obtained).

Then, step S226 is executed to report a IPD value to a system (e.g., a computer system) for the purpose of calibration of the subsequent 3D effect.

To sum up, in this application, the images of the eyeballs are obtained by the cameras fixed to the display modules and the deviation is calculated. Then, the display modules are moved by the driving module according to the calculated deviation, so that the display modules can be aligned to the eyeballs of the user to achieve the effect of automatic adjustment.

What is claimed is:

1. A head-mounted display device, comprising:
   a housing, suitable for covering a pair of eyeballs of the user;
   a pair of display modules, each of the pair of display modules comprising:
      a bracket, movably connected to the housing;
      a display panel, fixed to the bracket; and
      a lens, fixed to the bracket;
   a pair of cameras, respectively fixed to the pair of brackets to respectively capture images of the pair of eyeballs;
   a driving module, coupled to the pair of brackets to move the pair of brackets relative to the housing; and
   a control system, electrically connected to the pair of cameras and the driving module.

2. The head-mounted display device of claim 1, wherein the control system calculates a deviation between a center of a pupil of the eyeball and a center of the image according to the image of the corresponding eyeball captured by one of the pair of cameras, and moves the pair of brackets relative to the housing by the driving module according to the deviation.

3. The head-mounted display device of claim 1, wherein the driving module comprises:
   an actuator, disposed in the housing and electrically connected to the control system; and
   a transmission mechanism, disposed in the housing and coupled to the actuator and the pair of brackets.

4. The head-mounted display device of claim 3, wherein the actuator comprises a motor, the transmission mechanism comprises a gear set and a pair of racks, the pair of racks are respectively fixed on the pair of brackets, and the gear set is coupled between the motor and the pair of racks.

5. The head-mounted display device of claim 3, wherein the actuator comprises a motor, the transmission mechanism comprises a gear set, a screw and a screw sleeve, the screw sleeve is fixed to the pair of brackets and coupled to the screw, and the gear set is coupled between the motor and the screw.

6. The head-mounted display device of claim 1, wherein the driving module comprises:
   a pair of actuators, disposed in the housing and electrically connected to the control system; and
   a pair of transmission mechanisms, disposed in the housing and respectively coupled to the pair of actuators and the pair of brackets.

7. The head-mounted display device of claim 6, wherein the actuator comprises a motor, the transmission mechanism comprises a gear set and a rack, the rack is fixed to the corresponding bracket, and the gear set is coupled between the corresponding motor and the corresponding rack.

8. The head-mounted display device of claim 6, wherein the actuator comprises a motor, the transmission mechanism comprises a gear set, a screw and a screw sleeve, the screw sleeve is fixed to the corresponding bracket and coupled to the corresponding screw, and the gear set is coupled between the motor and the screw.

9. The head-mounted display device of claim 1, wherein the driving module comprises:
   a fixed magnet, fixed to one of the pair of brackets;

a rod-shaped magnet, one end of the rod-shaped magnet being fixed to another one of the pair of brackets, another end of the rod-shaped magnet facing the fixed magnet; and a coil, electrically connected to the control system and surrounding the rod-shaped magnet to generate an electromagnetic field to drive the rod-shaped magnet to move relative to the fixed magnet.

10. The head-mounted display device of claim 1, wherein the driving module comprises:

a pair of fixed magnets, respectively fixed to the pair of brackets;

a rod-shaped magnet, two ends of the rod-shaped magnet respectively facing the pair of fixed magnets; and a pair of coils, electrically connected to the control system and surrounding the rod-shaped magnet to generate electromagnetic fields to drive the two ends of the rod-shaped magnet to respectively move relative to the pair of fixed magnets.

11. The head-mounted display device of claim 1, further comprising:

a position sensor, electrically connected to the control system, and capable of sensing a position of one of the pair of display modules relative to the housing, wherein the position sensor senses the position of one of the pair of display modules relative to the housing, and the control system calculates a distance between the pair of display modules according to a sensed value of the position sensor.

12. The head-mounted display device of claim 1, further comprising:

a pair of position sensors, electrically connected to the control system, and capable of respectively sensing positions of the pair of display modules relative to the housing, wherein the pair of position sensors respectively sense the positions of the pair of display modules relative to the housing, and the control system calculates a distance between the pair of display modules according to sensed values of the pair of position sensors.

13. An adjustment method, applicable to a head-mounted display device, the head-mounted display device comprising:

a housing, suitable for covering a pair of eyeballs of the user;

a pair of display modules, each of the pair of display modules comprising:
a bracket, movably connected to the housing;
a display panel, fixed to the bracket; and
a lens, fixed to the bracket;

a pair of cameras, respectively fixed to the pair of brackets to respectively capture images of the pair of eyeballs;

a driving module, coupled to the pair of brackets to move the pair of brackets relative to the housing; and a control system, electrically connected to the pair of cameras and the driving module, wherein the adjustment method comprises:

capturing an image of the corresponding eyeball by one of the pair of cameras;

calculating a deviation between a center of a pupil of the corresponding eyeball and a center of the corresponding image by the control system according to the image; and controlling the driving module by the control system to move the pair of brackets relative to the housing according to the deviation.

14. The adjustment method of claim 13, wherein the driving module comprises:

an actuator, disposed in the housing and electrically connected to the control system; and a transmission mechanism, disposed in the housing and coupled to the actuator and the pair of brackets, wherein the step of moving the pair of brackets comprises:

controlling the actuator by the control system to generate a power according to the deviation; and converting the power generated by the actuator by the transmission mechanism to move the pair of brackets.

15. The adjustment method of claim 13, wherein the driving module comprises:

a pair of actuators, disposed in the housing and electrically connected to the control system; and a pair of transmission mechanisms, disposed in the housing and respectively coupled to the pair of actuators and the pair of brackets, wherein the step of moving the pair of brackets comprises:

controlling the pair of actuators by the control system to generate powers according to the deviation; and respectively converting the powers generated by the pair of actuators by the pair of transmission mechanisms to respectively move the pair of brackets.

16. The adjustment method of claim 13, wherein the driving module comprises:

a fixed magnet, fixed to one of the pair of brackets;

a rod-shaped magnet, one end of the rod-shaped magnet being fixed to another one of the pair of brackets, another end of the rod-shaped magnet facing the fixed magnet; and a coil, electrically connected to the control system and surrounding the rod-shaped magnet, wherein the step of moving the pair of brackets comprises:

generating an electromagnetic field by the coil to drive the rod-shaped magnet to move close to the fixed magnet or away from the fixed magnet.

17. The adjustment method of claim 13, wherein the driving module comprises:

a pair of fixed magnets, respectively fixed to the pair of brackets;

a rod-shaped magnet, two ends of the rod-shaped magnet respectively facing the pair of fixed magnets; and a pair of coils, electrically connected to the control system and surrounding the rod-shaped magnet, wherein the step of moving the pair of brackets comprises:

generating electromagnetic fields by the pair of coils to drive the two ends of the rod-shaped magnet to respectively move relative to the fixed magnet.

18. The adjustment method of claim 13, wherein the head-mounted display device further comprises:

a position sensor, electrically connected to the control system, and capable of sensing a position of one of the pair of display modules relative to the housing, wherein the adjustment method further comprises:

controlling the position sensor by the control system to sense the position of one of the pair of display modules relative to the housing; and calculating a distance between the pair of display modules by the control system according to a sensed value of the position sensor.

19. The adjustment method of claim 13, wherein the head-mounted display device further comprises:
  a pair of position sensors, electrically connected to the control system, and capable of respectively sensing positions of the pair of display modules relative to the housing, wherein the adjustment method further comprises:
    controlling the pair of position sensors by the control system to respectively sense the positions of the pair of display modules relative to the housing; and
    calculating a distance between the pair of display modules by the control system according to sensed values of the pair of position sensors.

* * * * *